US005493284A

United States Patent [19]

Kondo

[11] Patent Number: 5,493,284

[45] Date of Patent: Feb. 20, 1996

[54] METHOD OF SELECTIVELY INHIBITING MESSAGE DISPLAY IN RADIO PAGER

[75] Inventor: Hisashi Kondo, Tokyo, Japan

[73] Assignee: NEC Corporation, Tokyo, Japan

[21] Appl. No.: 905,383

[22] Filed: Jun. 29, 1992

[30] Foreign Application Priority Data

Jun. 27, 1991 [JP] Japan ........................ 3-156589

[51] Int. Cl.$^6$ ........................ H04Q 7/00

[52] U.S. Cl. ........................ 340/825.44; 340/825.31

[58] Field of Search ........................ 340/825.44, 825.31; 455/38.1, 38.2, 38.4

[56] References Cited

U.S. PATENT DOCUMENTS 5,146,217 9/1992 Holmes et al. ........................ 340/825.31

FOREIGN PATENT DOCUMENTS 8906477 7/1989 European Pat. Off. .
8906474 7/1989 European Pat. Off. .
63-169833 7/1988 Japan ........................ 455/38.4
4-114522 4/1992 Japan ........................ 455/38.4

*Primary Examiner*—Michael Horabik
*Attorney, Agent, or Firm*—Sughrue, Mion, Zinn, Macpeak & Seas

[57] ABSTRACT

In order to prevent unintentional display of messages to the view of a person or persons other than the subscriber, a radio pager is arranged to inhibit the display of an incoming message and/or inhibit the messages already stored in a memory to be displaced. The pager detects the display prohibition by checking the presence of control codes stored in a memory provided for storing the messages. The display prohibition can be set or removed via the selective manipulation of one or more of three switches.

11 Claims, 8 Drawing Sheets

| BIT NO. 7 | | | | | 0 | 0 | 0 | 0 | 1 | 1 | 1 | 1 |
|---|---|---|---|---|---|---|---|---|---|---|---|---|
| 6 | | | | | 0 | 0 | 1 | 1 | 0 | 0 | 1 | 1 |
| 5 | | | | | 0 | 1 | 0 | 1 | 0 | 1 | 0 | 1 |
| 4 | 3 | 2 | 1 | Column / Row | 0 | 1 | 2 | 3 | 4 | 5 | 6 | 7 |
| 0 | 0 | 0 | 0 | 0 | NUL | TC(DLE) | SP | 0 | | P | | p |
| 0 | 0 | 0 | 1 | 1 | TC(SOH) | DC | ! | 1 | A | Q | a | q |
| 0 | 0 | 1 | 0 | 2 | TC(STX) | DC | " | 2 | B | R | b | r |
| 0 | 0 | 1 | 1 | 3 | TC(ETX) | DC | £ (#) | 3 | C | S | c | s |
| 0 | 1 | 0 | 0 | 4 | TC(EOT) | DC | $(□) | 4 | D | T | d | t |
| 0 | 1 | 0 | 1 | 5 | TC(ENQ) | TC(NAK) | % | 5 | E | U | e | u |
| 0 | 1 | 1 | 0 | 6 | TC(ACK) | TC(SYN) | & | 6 | F | V | f | v |
| 0 | 1 | 1 | 1 | 7 | BEL | TC(ETB) | ' | 7 | G | W | g | w |
| 1 | 0 | 0 | 0 | 8 | FE(BS) | CAN | ( | 8 | H | X | h | x |
| 1 | 0 | 0 | 1 | 9 | FE(HT) | EM | ) | 9 | I | Y | i | y |
| 1 | 0 | 1 | 0 | 10 | FE(LF) | SUB | * | : | J | Z | j | z |
| 1 | 0 | 1 | 1 | 11 | FE(VT) | ESC | + | ; | K | [ | k | { |
| 1 | 1 | 0 | 0 | 12 | FE(FF) | IS(FS) | , | | L | \ | l | \| |
| 1 | 1 | 0 | 1 | 13 | FE(CR) | IS(GS) | – | = | M | ] | m | } |
| 1 | 1 | 1 | 0 | 14 | SO | IS(RS) | . | | N | ˙ | n | ˙ |
| 1 | 1 | 1 | 1 | 15 | SI | IS(US) | / | ? | O | ˙ | o | DEL |

FIG. 3

METHOD OF SELECTIVELY INHIBITING MESSAGE DISPLAY IN RADIO PAGER

BACKGROUND OF THE INVENTION

1. Field of the Invention

The present invention relates generally to improvements in a radio pager, and more specifically to a method of inhibiting the display of on incoming message and/or message(s) already stored in a pager, 2. Description of the Prior Art Radio pagers which are equipped with a display function have proven very popular in that a large amount of data can be acquired at one calling as compared with an older style type pager which alerts a person to call a single predetermined phone number merely by means of sound and/or flashing light.

As is well known in the art, if an incoming pager address code coincides with a pager ID (Identification) code which has been assigned to a pager, a controller of the pager energizes a speaker and/or LED (Light Emitting Diode) to alert the subscriber by providing an audible and/or visible signal.

A known display function equipped pager unconditionally displays a message which follows the pager address code if the incoming pager address code has been found coincident with the pager ID code.

Consequently, even if a pager subscriber wishes to keep a message Just received confidential, it is possible that a person other than the subscriber is able to observe the message which is being displayed. The same applies to the situation wherein the subscriber inadvertently forgets the pager or otherwise leaves the device unattended. The possibility that a personal message may be seen by another person is unpleasant irrespective of whether the message received is highly confidential or not.

Further, a known pager equipped with a display function is unable to selectively inhibit the display of a message(s) already stored in the pager. The message(s) stored can be displayed merely by pushing a display switch provided in the pager. However, this arrangement is deemed to suffer from the drawback that it is overly easy for a person other than the subscriber to access the message(s) stored in the pager and that such can still occur by accident.

SUMMARY OF THE INVENTION

It is an object of the present invention to provide a method of inhibiting the display of incoming messages which greatly obviates the drawback encountered with the prior art discussed immediately above.

Another object of the present invention is to provide a method of selectively inhibiting the display of the messages already stored in a pager.

In brief, the above objects are achieved by a technique wherein a radio pager is arranged to store messages in a memory and to display only those which are not designated as being prohibited upon demand. The display prohibition can be set or removed vie the selective manipulation of one or more of three switches.

More specifically, a first aspect of the present invention comes in a method of selectively prohibiting and allowing display of a message to be applied to a display function equipped pager, the pager including a memory for storing messages received and with first to third control switches, the method featuring the steps of: (a) entering into a pager function control menu mode by manipulating the first switch; (b) selecting a display control menu of an incoming message by manipulating the third control switch; (b) prohibiting incoming message display, if the incoming message display has been allowed, by writing a control code into a predetermined memory location of the memory by way of handling the second control switch; and (c) canceling prohibition of the incoming message display, if the incoming message display has been prohibited, by deleting the control code from the predetermined memory location by manipulating the second control switch.

A second aspect of the present invention comes in the form of a method of selectively prohibiting and allowing display of messages which have been stored in a memory of a display function equipped pager, the method featuring the steps of: (a) entering into a pager function control menu mode; (b) selecting a display control menu of stored messages; (c) selecting a message stored in the pager for checking to see if the display of the message selected is prohibited; (d) implementing a check to see if the display of the message selected is prohibited by checking the presence of a control code stored in the memory and assigned to the message selected; (e) displaying the message selected if the display of the message selected is permitted, prohibiting the display of the message selected by writing the control code into the memory or selecting a next message stored in the pager for checking to see if the display of the next message is prohibited, and returning to step (d); and (f) displaying a notification indicative of display prohibition if the display of the message selected is prohibited, canceling the display prohibition by deleting the control code from the memory or selecting a next message stored in the pager for checking to see if he display of the next message is prohibited, and returning to step (d).

Another aspect of the present invention comes in the form of a method of selectively prohibiting and allowing display of messages which have been stored in a memory of a display function equipped pager, the pager being provided with first to third control switches, the method comprising the steps of: (a) entering into a pager function control menu mode by manipulating the first control switch; (b) selecting a display control menu of stored messages by manipulating the third control switch; (c) selecting a message stored in the pager for checking to see if the display of the message selected is prohibited by manipulating the second control switch; (d) implementing a check to see if the display of the message selected is prohibited by checking presence of a control code stored in the memory and assigned to the message selected; (e) displaying the message selected if the display of the message selected is permitted, prohibiting the display of the message selected by writing the control code into the memory through handling the second control switch, or selecting e next message stored in the memory for checking to see if the display of the next message is prohibited by handling the third control switch, and returning to step (d); and (f) displaying a notification indicative of display prohibition if the display of the message selected is prohibited, canceling the display prohibition by deleting the control code from the memory through handling the second control switch, or selecting a next message stored in the memory for checking to see if the display of the next message is prohibited, and returning to step (d).

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 3 is a table depicting message units used in the present invention which are comprised of 7 bits and represents one of the characters and which are defined by ISO (International Standards Organization) 646;

DETAILED DESCRIPTION OF THE PREFERRED EMBODIMENTS

Figure 1:
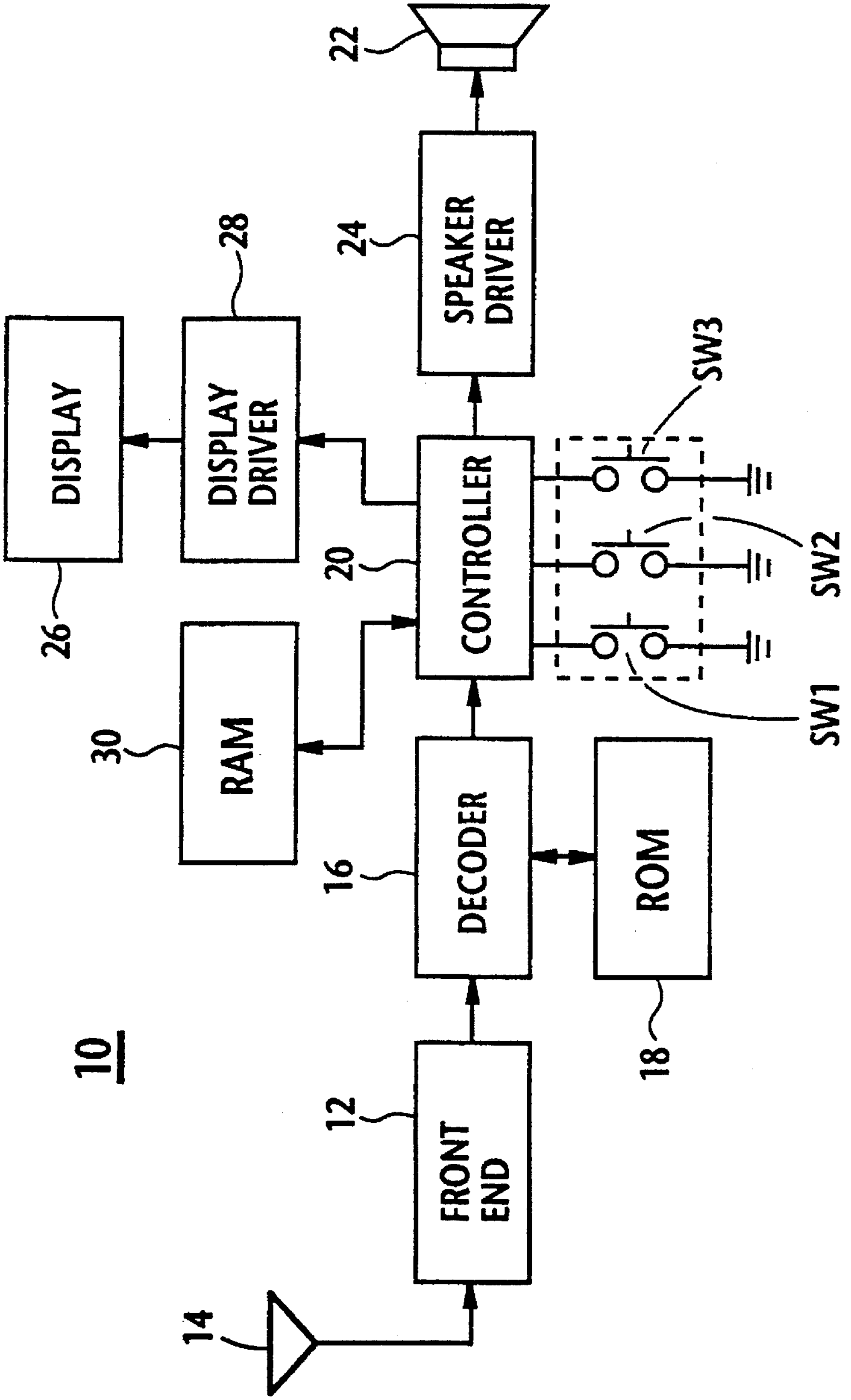
FIG. 1 is a block diagram showing a pager of the nature to which embodiments of the invention are applicable.

FIG. 1 is a block diagram showing a hardware arrangement of a radio pager 10 to which the present invention is applied.

A front end (viz., radio section) 12 is provided for amplifying and demodulating a code-modulated carrier wave received by an antenna 14. The front end 12 is conventional in construction end arrangement and comprises a high frequency amplifier, a frequency converter, an IF amplifier and a discriminator (not illustrated in FIG. 1). The output of the front end 12 is applied to a decoder 16 which is arranged to compare an incoming pager address code with a pager ID (Identification) code previously stored in a read only memory (ROM) 18. In the event that the incoming pager address code coincides with the pager ID code, the decoder 16 applies a message signal, which follows the coincident pager address code, to an controller 20. It is known in the art that the message signal is applied to the controller 20 after being subject to error correction in decoder 16. The controller 20 may take a form of a central processing unit (CPU).

The controller 20 energizes a speaker 22 by way of a speaker driver 24 upon being advised from the decoder 16 of the coincidence of the pager ID code with the incoming pager address. Although not shown in FIG. 1, a light source such as an LED (Light Emitting Diode) or the like, may be installed to provide a visible signal in addition to the audible one produced by the speaker 22.

In the event that the controller 20 detects that the message signal applied thereto is permitted to be displayed, the controller 20 induces the message to appear on a display 26 using a display driver 28 in a manner known in the art. On the other hand, if the controller 20 detects that the message signal just received is prohibited to be displayed, the controller 20 displays a suitable set of codes (e.g., MS) by which merely the arrival of the message is indicated. The controller 20 stores the message just received in a RAM (Random Access Memory) 30 irrespective of whether the message display is permitted or prohibited.

The above mentioned display permission/prohibition of the message received (viz., a first embodiment of the present invention), is set using three switches SW1, SW2 and SW3 coupled to the controller 20. The first embodiment will be described in detail later.

A second embodiment of the present invention is such as to prohibit or allow a message stored in the pager to be displayed.

Figure 2:
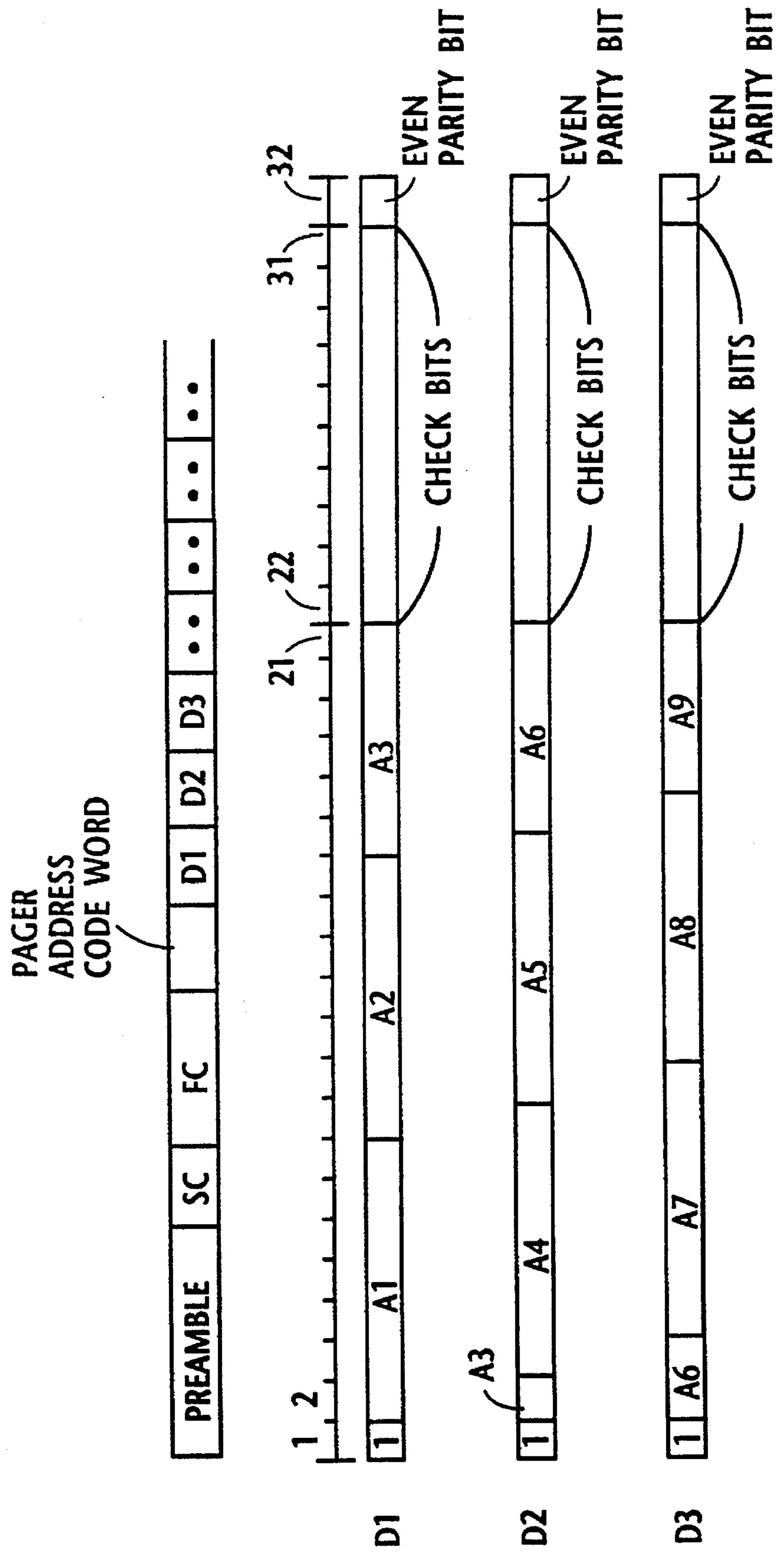
FIG. 2 is a code format which may be used with the present invention and which has been proposed by the POCSAG (British Post Office Code Standardization Advisory Group)

FIG. 2 shows, by way of example, a code format which may be used with the present invention. Such a code format has been proposed by the POCSAG (British Post Office Code Standardization Advisory Group). It should be noted however, that the present invention is not limited to the code format shown in FIG. 2.

As shown at the uppermost row of FIG. 2, a transmission consists of a preamble, a synchronization code (SC), a frame synchronization code (FC), a pager address codeword, and a plurality of message (viz., date) codewords denoted by D1, D2, D3, . . . in this order.

Each of the message codewords D1, D2, D3, . . . consists of 32 bits wherein the first bit indicates whether the corresponding codeword is an address codeword or a message codeword and wherein the last eleven bits are check bits and an even parity bit. In this particular embodiment, a logic "1" denotes the message codeword while a logic "0" denotes a pager address codeword (although not shown).

Each of message units such as A1–A9, is comprised of 7 bits and represents one of the characters which are defined by ISO (International Standards Organization) 646 as shown in FIG. 3.

More specifically, the first 4 bits (viz., bit Nos. 1–4 in FIG. 3) of a given message unit are used to indicate a row while the remaining 3 bits (viz., bit Nos. 5–7) define a column. Further, each of the message units A1–A9 indicates one of the characters positioned in the second to seven columns of the table of ISO 646.

The aforesaid display control of the first embodiment utilizes, as e control code (denoted by a control code A), one of function codes positioned in the first and second columns of the table shown in FIG. 3. On the other hand, the display control of the second embodiment utilizes, as a control code, one selected from the function codes preferably other than the control code A. For the sake of convenience, the control code used in the second embodiment is depicted by a control code B. The reason why function codes are used as the control codes A and B, is to clearly distinguish same from the message codes.

Figure 4:
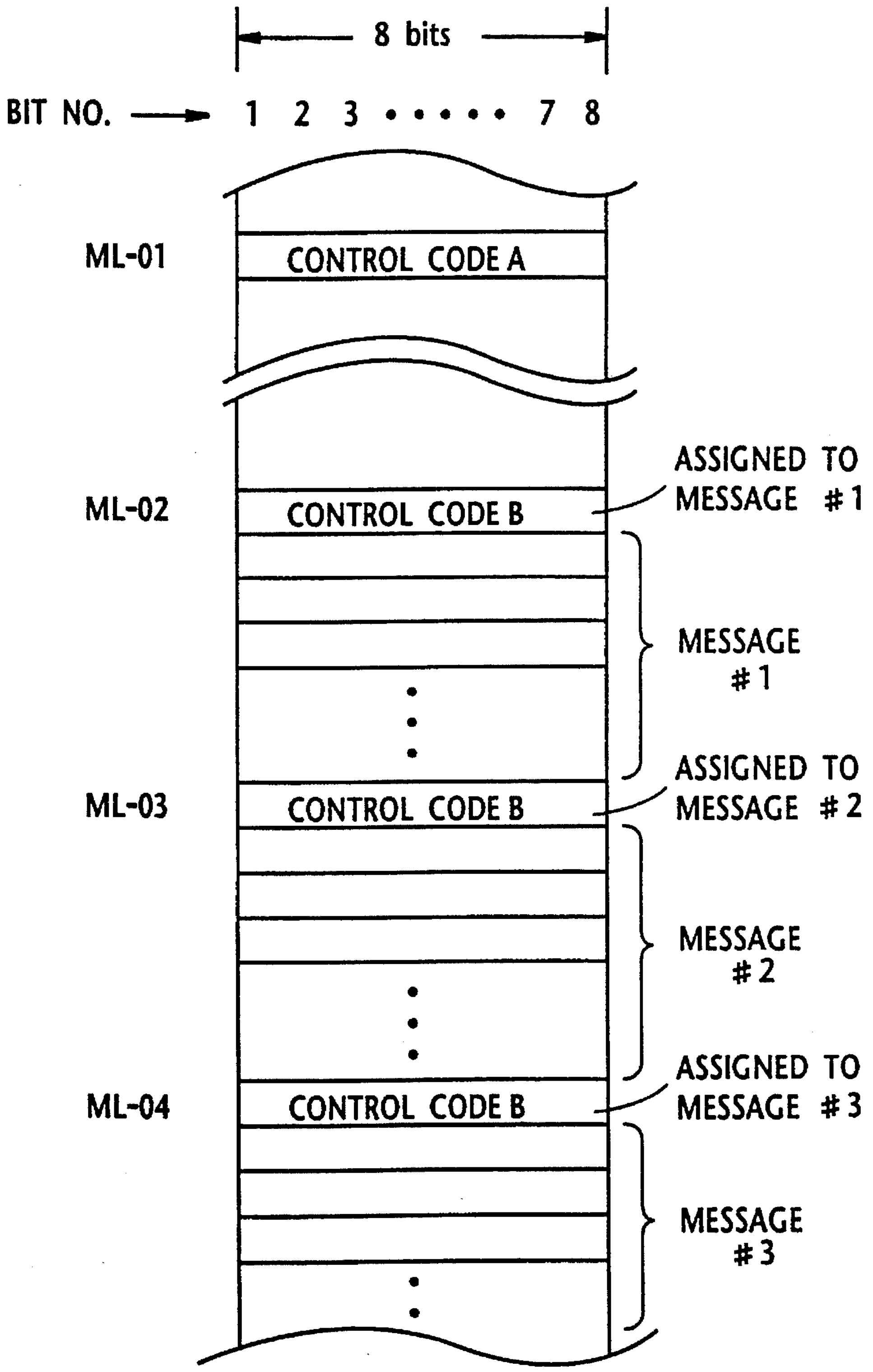
FIG. 4 is a diagram schematically showing a memory map of RAM 30 wherein the control codes A and B which are used in connection with the present invention are indicated.

FIG. 4 is a diagram schematically showing a memory map of the RAM 30 wherein the control codes A and B are indicated. In more specific terms, the control code A is stored in a suitable memory position in the RAM 30, while each of the control codes B is stored at a predetermined position within the memory section assigned to the corresponding message storage. In the case illustrated, the control code B is stored in a memory section which precedes each of the bytes provided for messages #1, #2, #3 . . . It should be noted that one bit of each byte shown in FIG. 4 is a check bit although not specifically shown in the drawing. Merely for the convenience of descriptions, the control code A is to be located at a memory location ML-01, while the plural control codes B at memory locations ML-02, ML-03, ML-04, . . .

If the control code A is present at the memory position ML-01, the controller 20 prohibits the display of the incoming message and displays the code (e.g. MS) indicating the receive message display prohibition. On the other hand, the controller 20 fails to detect the presence of the control code A upon receiving a message, the incoming message is displayed as in a conventional manner.

When a given message stored in the RAM 30 is requested to be displayed, if the controller 20 detects the control code B assigned to the message in question, the message is not displayed. In this case, a suitable code (e.g., PROHIBITED) representative of the display prohibition is preferably indicated on the display 26. Contrarily, if the controller 20 fails to detect the presence of the control code B assigned to the message in question, the message is displayed as in a known manner.

The first embodiment (viz., the permission or prohibition of the message received) will further be discussed with reference to FIGS. 5 and 6.

Figure 5:
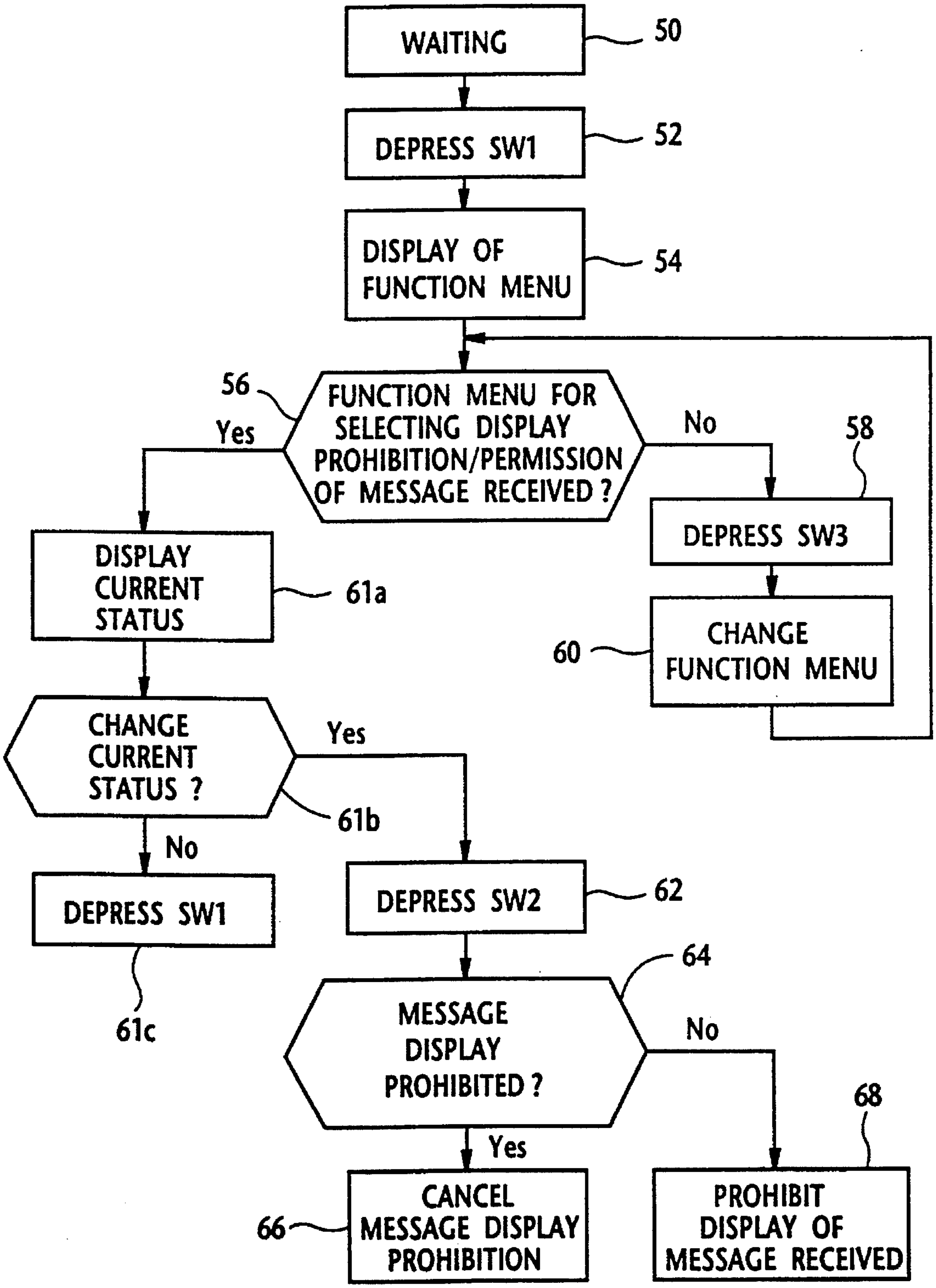
FIG. 5 is a flow chart which shows the steps which characterizes the allowance or prohibition of an incoming message to be displayed in accordance with a first embodiment of the present invention.

FIG. 5 is a flow chart which shows the steps which characterizes the allowance or prohibition of an incoming message to be displayed.

According to the routine depicted in FIG. 5, when the switch SW1 is depressed while the pager is ready for signal reception (steps 50, 52), one function of the function menus is displayed on the display 26 (FIG. 1) at step 54. That is, the switch SW1 is used to enter into a function menu mode while the pager is waiting for signal directed thereto. Following this, it is checked to see if the function menu displayed is the one for selecting the display prohibition or permission of an incoming message (step 56) or not. If the outcome of the enquiry performed in step 56 is "no", the switch SW3 is depressed for changing (viz., scrolling through) the function menu displayed (steps 58, 60) and the program loops back to step 56.

In the event of a positive outcome ("yes") at step 56, the routine proceeds to step 61a wherein the current status of the message is displayed. Viz., the display 26 indicates whether the pager 10 is in a condition for prohibiting or permitting the incoming message from being displayed. Following this, the routine goes to step 61*b* wherein the subscriber is given the opportunity to change the current display status.

If the subscriber does not wish to change the message display status (e.g. wishes to maintain the prohibition of the message display) then he or she operates switch SW1 (step 61*c*).

On the other hand, if the subscriber wishes to change the current condition (viz., change the message display permission or prohibition), he or she depresses the switch SW2 at step 52. In the event that the present condition is to prohibit the display of an incoming message, the pager 10 is set to the condition of the message display permission by depressing the switch SW2 (steps 62, 64 and 66). The cancellation of the message display prohibition is implemented by deleting the control code A from the memory location ML-01 as shown in FIG. 4. Contrarily, if the present condition is to permit the display of an incoming message, then the pager 10 is set to the condition for prohibiting the incoming message display by depressing the switch SW2 (steps 62, 64 and 68). The prohibition of the message display is carried out by writing the control code A into the memory location ML-01. Thus, the switch SW2 operates such as to reverse the current condition of the message display.

In the event that the subscriber finishes the selection of the display prohibition/permission of the incoming message, the subscriber depresses the switch SW1 for returning to the waiting mode.

It is possible to design the pager 10 to continue to check the coincidence of the pager address code with the pager ID code during the display prohibition or permission operations by the subscriber.

Figure 6:
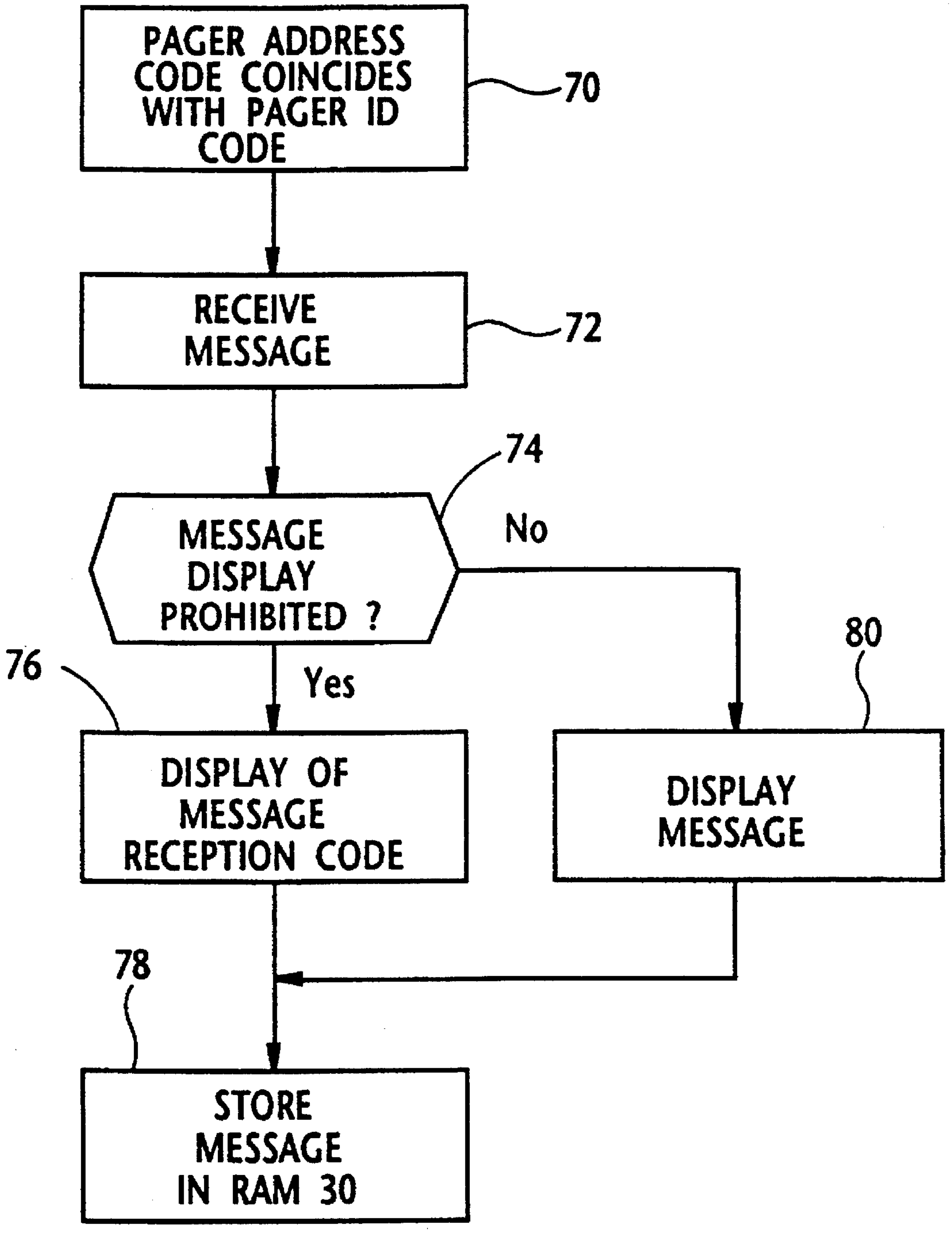
FIG. 6 is a flow chart which characterizes the steps via which the display of an incoming message is prohibited or permitted in accordance with the first embodiment of the present invention.

FIG. 6 is a flow chart which depicts the steps via which the display of an incoming message is prohibited or permitted.

In FIG. 6, when a pager address code applied to the decoder 16 (FIG. 1) is found coincident with the pager ID code and is followed by a message (steps 70, 72), a check is made to see if the incoming message display is prohibited at step 74. If the answer is affirmative (viz., the control code A exists at the memory location ML-01 of the RAM 30 (gee FIG. 4)), the controller 20 displays only the message reception code (viz., MS for example) indicative of the arrival of a message (step 76) and then stores the fresh message in a memory section within the RAM 30 such as indicated by message #1 (for example) in FIG. 4 (step 78). On the other hand, if the answer is negative at step 74, the incoming message is displayed and then stored in the RAM 30 (steps 80, 78).

Figure 7A:
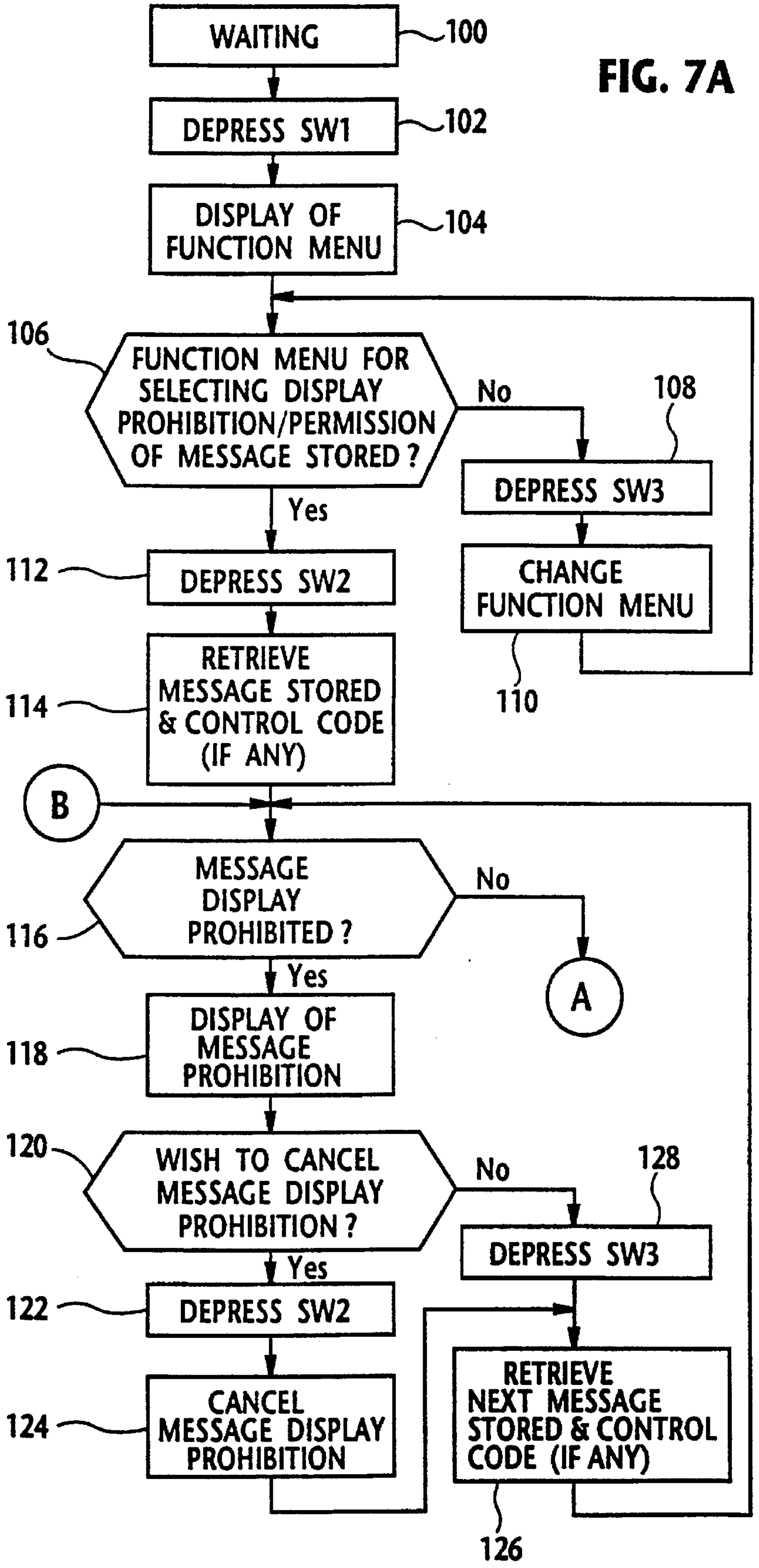
FIGS. 7A and 7B show in flow chart form the steps which characterize the operation of a second embodiment of the present invention.
Figure 7B:
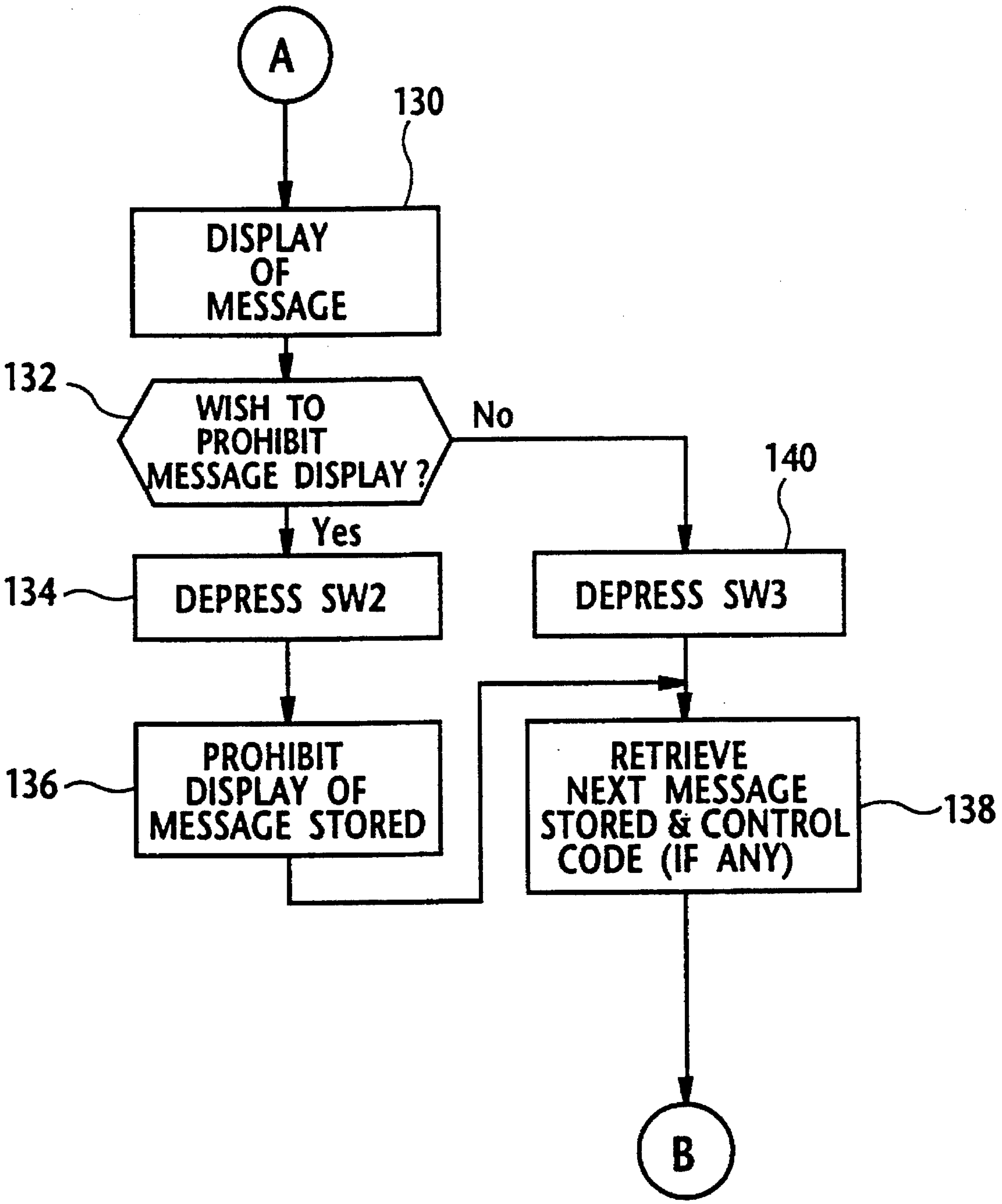

FIGS. 7A and 7B depict a flow chart which characterizes the steps of the second embodiment and shows the manner in which the messages stored in the RAM 30 are selectively prohibited in terms of the display thereof. It is assumed that a plurality of messages has been stored in the RAM 30.

In FIGS. 7A and 7B, when the switch SW1 is depressed while the pager 10 is ready for signal reception (steps 100, 102), one of plural function menus is displayed on the display 26 (FIG. 1) at step 104. Following this, a check is made to see if the function menu displayed is the one for setting the display prohibition or permission of the message(s) already stored (step 106). If the answer is "no" at step 106, the switch SW3 is depressed to induce the next function menu to be displayed (steps 108, 110), after which the program goes back to step 106.

In the event of a positive outcome ("yes") at step 106, the subscriber depresses the switch SW2 for selecting the menu displayed (step 112). Subsequently, the controller 20 retrieves a first message and the corresponding control code B (if any) stored in the RAM 30 (step 114). The controller 20 then checks to see if the display of the message retrieved is prohibited (step 116) by checking to see if a control code B has been assigned to the message retrieved or not.

In the event of a positive outcome at step 116, a suitable code (e.g., PROHIBITED) is displayed at step 118. If the subscriber wishes to cancel the display prohibition of the message in question (step 120), he or she depresses the switch SW2 at step 122. Thus, at step 124, the display prohibition is canceled in connection with the message which has been retrieved from the RAM 30. This cancellation is carried out by deleting the control code B assigned to the message in question. When the switch SW2 is depressed at step 122, the next message and the corresponding control code B (if any) is retrieved (step 126).

It is understood that the depression of SW2 at step 122 serves to cancel the message display prohibition and simultaneously retrieve the next message in this particular embodiment (steps 124, 126). Following this, the routine goes back to step 116.

In the case of a negative output at step 120, the subscriber depresses the switch SW3 (step 128) for retrieving the next message stored (step 126).

If the answer is "no" at step 116, the routine goes to step 130 (FIG. 7B) wherein the message retrieved at step 114 is displayed. In the event that the subscriber wishes to prohibit the display of the message now demonstrated on the display 26, he or she depresses the switch SW2 (steps 132, 134). Thus, the control code B is written into a predetermined memory location for prohibiting the display of the message presently on the display (step 136). As in the above mentioned case, the depression of SW2 at step 134 prohibits the message display end simultaneously retrieves the next message (steps 136, 138). Subsequently, the routine goes back to step 116.

On the other hand, if the subscriber does not wish the display prohibition of the message demonstrated (steps 130, 132), the subscriber depresses the switch SW3 at step 140 and thus the controller 20 retrieves the next message at step 138, and then the routine returns to step 116.

After setting the display prohibition or permission of the message(s) stored An the RAM 30, if the subscriber wishes to display the message(s), the subscriber depresses the switch SW1 for selecting a message display function menu and displaying a first message stored (e.g., the latest message among the messages stored). If the display of the message in question is prohibited, the display prohibition message such as "PROHIBITED" is demonstrated on the display 36. The following messages can sequentially be selected by depressing the switch SW2.

It will be understood that the above disclosure is representative of only two possible embodiments of the present invention and that the concept on which the invention is based is not specifically limited thereto.

What is claimed is:

1. A method of selectively prohibiting and allowing display of massages which have been stored in a memory of a display function equipped pager, said method comprising the steps of:

(a) entering into a pager function control menu mode;

(b) selecting a display control menu of stored messages;

(c) selecting a message stored in the pager for checking to see if the display of the message selected is prohibited;

(d) implementing a check to see if the display of the message selected is prohibited by checking the presence of a control code stored in said memory and assigned to the message selected;

(e) displaying the message selected if the display of the message selected is permitted, prohibiting the display of the message selected by writing said control code into said memory or selecting a next message stored in the pager for checking to see if the display of the next message is prohibited, and returning to step (d);

(f) displaying a notification indicative of display prohibition if the display of the message selected is prohibited, canceling the display prohibition by deleting the control code from said memory or selecting a next message stored in the pager for checking to see if the display of the next message is prohibited, and returning to step (d).

2. A method of selectively prohibiting and allowing display of messages which have been stored in a memory of a display function equipped pager, the pager including a function controller having a plurality of subscriber manipulating switches, said method comprising the steps of:

(a) entering into a pager function control menu mode via said function controller;

(b) selecting a display control menu of stored messages via said function controller;

(c) selecting a message stored in said memory via said function controller;

(d) checking to see if a control code is assigned to the message selected;

(e) if said control code is not assigned to the message selected, (1) displaying the message selected, and (2) if the message selected should not be displayed, writing said control code into said memory via said function controller to assign said control code to said message selected; and (f) if said control code is assigned to the message selected, (1) displaying a notification indicative of display prohibition, and (2) if the message selected should be displayed, deleting said control code from said memory via said function controller.

3. A method as claimed in claim 2, wherein said function controller includes a first, second and third switches, said first switch being used to execute step (a), said second switch being used to execute steps (c), (e) and (f), and said third switch being used to execute step (b).

4. A method of selectively prohibiting and allowing display of a message received by a display function equipped pager, the pager including a memory for storing messages received and a function controller having a plurality of subscriber manipulating switches, said method comprising the steps of:

(a) entering into a pager function control menu mode via said function controller;

(b) selecting an incoming message display control menu via said function controller;

(c) writing a control code into a predetermined memory location of said memory by way of said function controller if an incoming message should not be displayed; and (d) deleting said control code from said predetermined memory location by way of said function controller if the incoming message should be displayed;

wherein said function controller includes first, second and third switches, said first switch being used to execute step (a), said second switch being used to execute steps (c) and (d), and said third switch being used to execute step (b).

5. A method of selectively prohibiting and allowing display of a message received by a display function equipped pager, the pager including a memory for storing messages received and a function controller having a plurality of subscriber manipulating switches, said method comprising the steps of:

(a) entering into a pager function control menu mode via said function controller;

(b) selecting an incoming message display control menu via said function controller;

(c) if an incoming message should not be displayed, writing a control code into a predetermined memory location of said memory by way of said function controller without affecting whether messages already stored in the memory can be displayed; and (d) if the incoming message should be displayed, deleting said control code from said predetermined memory location by way of said function controller.

6. A method as claimed in claim 5, wherein said function controller includes a first, second and third switches, said first switch being used to execute step (a), said second switch being used to execute steps (c) and (d), and said third switch being used to execute step (b).

7. The method recited in claim 5, wherein each said incoming message is stored in said memory as a stored message, and said control code of said stored message is an individual message control code, said method further allowing selective prohibition and allowance of display of each said stored message received and stored in said memory, and said method further comprising the steps of:

(e) selecting, while in said pager function control menu mode, a display control menu of stored messages;

(f) selecting the stored message via said function controller;

(g) checking to see if said individual message control code is assigned to the stored message selected;

(h) if the said individual message control code is not assigned to the stored message selected, (1) displaying the stored message selected, and (2) if the stored message selected should not be displayed, writing said individual message control code into said memory via said function controller to assign said individual message control code to the stored message selected; and (i) if said individual message control code is assigned to the stored message selected, (1) displaying a notification indicative of display prohibition, and (2) if the stored message selected should be displayed, deleting said individual message control code from said memory via said function controller.

8. The method recited in claim 7, wherein said function controller includes first, second, and third switches, the first switch being used to execute step (a), the second switch being used to execute steps (c) and (d), and the third switch being used to execute step (b).

9. The method recited in claim 7, wherein said function controller includes first, second, and third switches, the first switch being used to execute step (a), the second switch being used to execute steps (f), (h) and (i), and the third switch being used to execute step (e).

10. The method recited in claim 5, wherein each said incoming message is stored in said memory as a stored message, and said control code of said stored message is an individual message control code, said method further allowing selective prohibition and allowance of display of each said stored message received and stored in said memory, and said method further comprising the steps of:

(e) selecting, while in said pager function control menu mode, a display control menu of stored messages;

(f) selecting the stored message stored in the pager;

(g) checking to see whether display of the message selected is prohibited, by checking for the presence of said individual message control code stored in said memory and assigned to the stored message selected;

(h) if the display of the stored message selected is permitted, (1) displaying the stored message selected, (2) selectively prohibiting the display of the stored message selected by writing said individual message control code into said memory, (3) selecting a next message stored in the pager, and (4) returning to step (g); and (i) if the display of the stored message selected is prohibited, (1) displaying a notification indicative of the display prohibition, (2) selectively allowing cancellation of the display prohibition by deleting said individual message control code from said memory, (3) selecting a next stored message, and returning to step (g).

11. The method recited in claim 10, wherein said function controller includes first, second, and third switches, the first switch being used to execute step (a), the second switch being used to execute steps (c) and (d), and the third switch being used to execute step (b).

* * * * *

UNITED STATES PATENT AND TRADEMARK OFFICE
CERTIFICATE OF CORRECTION

PATENT NO. : 5,493,284
DATED : February 20, 1996
INVENTOR(S) : Hisashi KONDO

It is certified that error(s) appears in the above-identified patent and that said Letters Patent is hereby corrected as shown below:

IN THE ABSTRACT:

Line 5, change "displaced" to --display--.

IN THE SPECIFICATION:

| | | |
|---|---|---|
| Column 1, | line 9, | change "on" to --an--; |
| | line 30, | change "Just" to --just--; |
| | line 61, | change "vie" to --via--. |
| Column 2, | line 54, | change "e" to --a--. |
| Column 3, | line 39, | change "end" to --and--. |
| Column 4, | line 22, | change "date" to --data--; |
| | line 42, | change "e" to --a--. |
| Column 6, | line 13, | change "gee" to --see--. |
| Column 7, | line 16, | change "An" to --in--. |
| Column 7, | line 31, | change "massages" to --messages--; |

UNITED STATES PATENT AND TRADEMARK OFFICE

CERTIFICATE OF CORRECTION

PATENT NO. : 5,493,284

DATED :

INVENTOR(S) :

It is certified that error appears in the above-indentified patent and that said Letters Patent is hereby corrected as shown below:

Column 7, line 31, change "massages" to --messages--;
line 47, after "(d);" insert --and--.

Signed and Sealed this

Sixteenth Day of July, 1996

Attest:

BRUCE LEHMAN

Attesting Officer

*Commissioner of Patents and Trademarks*